(12) United States Patent
Larkina et al.

(10) Patent No.: US 10,587,620 B2
(45) Date of Patent: Mar. 10, 2020

(54) SYSTEM AND METHOD OF LIMITING USER ACCESS TO SUSPICIOUS OBJECTS OF A SOCIAL NETWORK

(71) Applicant: AO Kaspersky Lab, Moscow (RU)

(72) Inventors: Anna D. Larkina, Moscow (RU); Vladislav N. Tushkanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 139 days.

(21) Appl. No.: 15/668,924

(22) Filed: Aug. 4, 2017

(65) Prior Publication Data

US 2018/0316683 A1 Nov. 1, 2018

(30) Foreign Application Priority Data

Apr. 28, 2017 (RU) .................................. 2017115052

(51) Int. Cl.
| | |
|---|---|
| H04L 9/00 | (2006.01) |
| H04L 29/06 | (2006.01) |
| H04L 29/08 | (2006.01) |
| H04W 4/21 | (2018.01) |

(52) U.S. Cl.
CPC ........ H04L 63/101 (2013.01); H04L 63/1441 (2013.01); H04L 67/306 (2013.01); H04W 4/21 (2018.02)

(58) Field of Classification Search
USPC ........................................................... 726/3
See application file for complete search history.

(56) References Cited

U.S. PATENT DOCUMENTS

| | | | |
|---|---|---|---|
| 8,606,787 B1 | 12/2013 | Asgekar et al. | |
| 8,909,646 B1 | 12/2014 | Fabrikant et al. | |
| 9,124,617 B2 * | 9/2015 | Palumbo | G06F 21/56 |
| 9,202,052 B1 | 12/2015 | Fang et al. | |
| 9,424,612 B1 | 8/2016 | Bright et al. | |
| 9,451,085 B2 * | 9/2016 | Skiba | H04M 3/5175 |
| 10,158,659 B1 * | 12/2018 | Huang | H04L 63/1425 |
| 2006/0021009 A1 | 1/2006 | Lunt | |
| 2008/0040673 A1 | 2/2008 | Zuckerberg et al. | |
| 2013/0013601 A1 | 1/2013 | Kabiljo et al. | |
| 2013/0024516 A1 | 1/2013 | Blinder | |
| 2014/0214936 A1 | 7/2014 | Abraham et al. | |

(Continued)

FOREIGN PATENT DOCUMENTS

| | | |
|---|---|---|
| EP | 2725532 A1 | 4/2014 |
| JP | 2009069877 A | 4/2009 |
| JP | 2010066814 A | 3/2010 |

(Continued)

*Primary Examiner* — Christopher J Brown
(74) *Attorney, Agent, or Firm* — Arent Fox LLP; Michael Fainberg

(57) ABSTRACT

Disclosed are systems and methods for limiting access of a user profile to dangerous content in a social network service. The described system produces a social graph for a given user profile in the social network service, and identifies clusters of objects (e.g., other user profiles, contents) within the social graph. The described system analyzes whether certain objects in the social graph should be characterized as suspicious based on their clustering and on a database of known forbidden objects. The described system may further learn and add unknown objects to the database of forbidden objects.

17 Claims, 7 Drawing Sheets

(56) References Cited

U.S. PATENT DOCUMENTS

2014/0337317 A1 11/2014 Woss et al.
2015/0067777 A1 3/2015 Heise

FOREIGN PATENT DOCUMENTS

| JP | 2011170471 A | 9/2011 |
|----|--------------|--------|
| JP | 2016118952 A | 6/2016 |
| WO | 2013/173648 A2 | 11/2013 |

* cited by examiner

SYSTEM AND METHOD OF LIMITING USER ACCESS TO SUSPICIOUS OBJECTS OF A SOCIAL NETWORK

CROSS-REFERENCE TO RELATED APPLICATIONS

This application claims benefit of priority under 35 U.S.C. 119(a)-(d) to a Russian Application No. 2017115052 filed on Apr. 28, 2017, which is incorporated by reference herein.

FIELD OF TECHNOLOGY

The present disclosure relates generally to social network services and, in particular, system and methods of limiting user access to suspicious objects of a social network service.

BACKGROUND

At present it is hard to imagine any sphere of human activity in which computer technologies are not used. In the modern world, users are spending ever more of their free time on the Internet, especially on social networks (also referred to as social network services, social media, or social networking sites). For just this reason, social networks have become a lucrative place for hackers. Fraudsters create fake user or group profiles on social networks, and also unlawfully gain access to ("hack") the profiles of ordinary users. With the use of such fake profiles, hackers engage in the spread of malicious programs, forbidden and illegal content, as well as social engineering, extortion, phishing and other fraudulent or even criminally punishable actions. Many users and in particular children fall victim to such actions.

In view of the growing threat which has arisen in connection with the use of the Internet by children, parental control software is becoming increasingly popular. Parental control software limits access of a user (who is usually a child) to computer resources and the Internet in accordance with rules imposed by another user (usually the parent). However, with the use of such systems, it is often impossible to limit access to specific forbidden and suspicious objects of a social network (the profiles of other users, the profiles of groups, content elements such as photographs, audio and video recordings, and so on) without limiting access to the social network itself, i.e., the entire social network. A technical problem arises involving the accessibility of suspicious objects of social networks.

However, the existed technologies do not solve the technical problem of a user's access to specific suspicious objects of a social network.

SUMMARY

Thus, a system and method is disclosed herein for limiting user access to suspicious objects of a social network service. The technical result of the present disclosure includes enabling a limiting of user access to suspicious objects of a social network and the improved security resulting therefrom due to the decrease in exposure to suspicious objects and malicious actors in a social network.

According to one aspect of the present disclosure, a method for limiting user access to suspicious objects of a social network service is provided. The method includes retrieving a social graph for a first user profile in a social network service, wherein the social graph comprises a plurality of objects to which the first user profile is linked. The method further includes identifying one or more clusters of objects in the social graph, and determining, for each identified cluster, a first object that is linked to at least a threshold number of peer objects in the respective cluster. The method includes, responsive to determining that the first object is forbidden according to a database of forbidden objects, determining that the peer objects are suspicious based on social links between the first object and the peer objects, and limiting access of the first user profile to the peer objects determined to be suspicious in the social network service.

In another aspect, determining that the peer objects are suspicious based on social links between the first object and the peer objects further includes determining that the peer objects are suspicious on a further basis of a determination that the peer objects belong to a cluster in which a majority of the objects of that cluster are linked to forbidden objects.

In another aspect, the method further includes determining that all objects in a respective cluster are suspicious based on a determination that an intra-cluster threshold has been reached of peer objects in the respective cluster having been determined to be suspicious.

In another aspect, the method further includes selecting a known object in the social network service from the database of forbidden objects, selecting objects that are linked to the selected known object using the social graph, and adding, to the database of forbidden objects, unknown objects that are absent from the database of forbidden objects and that are linked to the selected known object.

In another aspect, adding unknown objects to the database of forbidden objects further includes determining a measure of similarity of each unknown object with the known object based on common user profiles having a social link to the known object and to the respective unknown object, and adding the unknown objects responsive to determining that the respective measures of similarity of the unknown objects with the known object exceeds a similarity threshold.

In another aspect, determining the first object further includes selecting the first object based on a determination that the cluster in which the first object is contained has less than a container threshold number of objects.

In another aspect, wherein the plurality of objects comprises user profiles, groups of user profiles, and content elements, and wherein the social graph comprises a plurality of social links between the plurality of objects and the first user profile.

According to another aspect, a system is provided for limiting user access to suspicious objects of a social network service. The system includes a storage device containing a database of forbidden objects, and a processor. The processor is configured to retrieve a social graph for a first user profile in a social network service, identify one or more clusters of objects in the social graph, and determine, for each identified cluster, a first object that is linked to at least a threshold number of peer objects in the respective cluster. The social graph comprises a plurality of objects to which the first user profile is linked. The processor is further configured to, responsive to determining that the first object is forbidden according to the database of forbidden objects, determine that the peer objects are suspicious based on social links between the first object and the peer objects, and limit access of the first user profile to the peer objects determined to be suspicious in the social network service.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for limiting user access to suspicious objects of a social network service. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
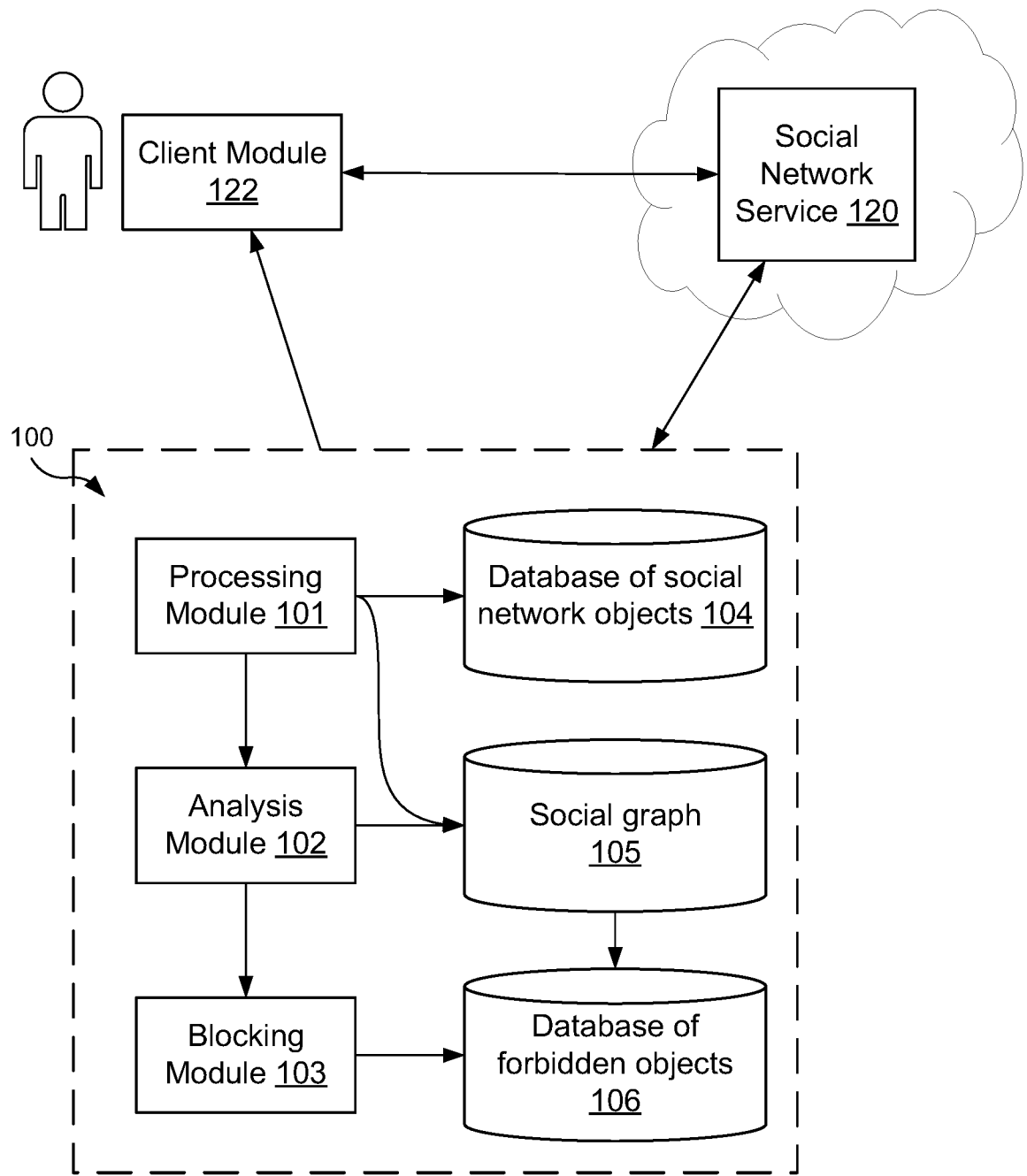
FIG. 1 is a block diagram of illustrating a system for limiting user access to suspicious objects of a social network service according to an exemplary aspect.

FIG. 1 is a block diagram illustrating a system 100 for limiting user access to suspicious objects of a social network service according to an exemplary aspect. The system 100 includes a processing module 101 configured to produce a social graph 105, constructed for a given user profile (hereinafter, a profile) in a social network service 120. The given profile can be specified (selected) by the administrator of the present system. For example, if the present system is a parental control system, said user can be specified (selected) by the administrator of the parental control system (such as the parent of the child, or a specified user). In some aspects, the processing module 101 may obtain the social graph 105 (e.g., via export, or an API call) from the social network service 120.

A social network service 120 (interchangeably referred to as a social network) is an online service in which users can build social relationships with other users based on interests, activities, backgrounds, and real-life connections. Social network services typically allow a user to construct a public (or semi-public) profile within the service, indicate a list of other users with whom to form a connection, and traverse the list of connections and those made by other users within the service.

A user may access the social network service 120 through a variety of user interfaces, including a client module 122. The client module 122 can be a web browser application configured to access a web-based application of the social network service 120. In other aspects, the client module 122 may also include mobile application, a desktop application, e-mail, or messaging platforms. The social network service 120 may also be programmatically accessed by computing systems (e.g., system 100) via an application programming interface (API).

In one exemplary aspect, the social graph 105 may be a graph whose vertices are specified objects of the social network, while the presence of an edge between the two vertices indicates the presence of a social link between two objects of the social network situated at the aforementioned two vertices. The objects of the social network can be, in particular, user profiles. The social graph 105 contains the specified profile and at least one other profile of the social network with which the specified profile is linked. In other words, the social graph 105 contains a specified profile and other profiles which are linked directly to the specified profile. All objects of the social graph 105 are objects of the social network. However, in the general case, not all objects of the social network are contained in the constructed social graph 105. In some exemplary aspects, the profiles can include the user profiles and the profiles of groups of users (or group profiles). Objects of the social network include user profiles and content elements. Content elements may be, in particular, the following: photographs, video, audio (music), and text information. In some aspects, content elements may be associated with one or more user profiles. Content elements may be provided by one or more users, i.e., uploaded to the social network by a user, also known as user-generated content.

The system 100 further includes a database 104 configured to store the data of objects of the social network. The data of objects of the social network may include, in particular, the attributes of the objects. The user profiles may include, in particular, one or more of the following attributes: the identifier, the type of object, a link to a user profile in the social network, the name, date of birth, and so forth. The profiles of groups may include one or more of the following attributes: the identifier, the type of object, a link to the group profile in the social network, themes, date of creation, description of the group, and so forth.

A social link (hereinafter, link) between two objects of the social network refers to a link established by the social network between objects of the social network. For example, user A, who has the user profile A, has added user B, who has the user profile B, as a friend (using the control elements of the social network), subscribed to updates of user B, or added user B to subscribers. A corresponding social link is therefore established between the profiles of users A and B. Depending on the established social link, users A and B will have access to corresponding information (e.g., profiles, content elements) and capabilities of the social network. For example, if a "friendship" link is established between profiles A and B, user A is then permitted to view the profile information of user B and may be able to write messages to user B. A social link can be asymmetrical (i.e., one-way) or symmetrical, meaning the social link from one user to another user bestows an equivalent relationship the other way around. For example, user B will have the same capabilities to view and write messages to user A. Other types of social links may include a "follower" link indicating user A follows user B, a "member of" link indicating user A is a member of a profile of a group of users in the social network, a "blocked" link indicating that a user A wishes to prevent contact and connections from another user B in the service, and other links which may have different nomenclature depending on the particular social network service. It is noted that in the present disclosure the term "user" may sometimes be used to refer to the user profile associated with a user.

The processing module 101 also serves to identify in the social graph 105 clusters of users in accordance with a particular algorithm (method) of clustering (an example of the identifying of clusters will be given below, in FIG. 2). In a particular aspect, the identifying of clusters of users is done in such a way that the number of social links between the profiles of the users of one cluster is not less than (i.e., greater than or equal to) the number of social links between the profiles of the users from different identified clusters. For example, if a first user profile is assigned to a first cluster, the number of social links of the first user profile with each profile from the first cluster will be not less than the number of social links of the first user profile with any other user profile not contained in the first cluster.

The system 100 includes an analysis module 102 communicatively connected to the processing module 101 and is configured to determine for one or more identified clusters in the social network at least one object which is linked to not less than a given number of profiles contained in the identified cluster. In one exemplary aspect, the analysis module 102 serves to determine, for each identified cluster in the social network, at least one object which is linked to not less than a given number of profiles contained in said identified cluster. The given number of profiles may be determined in advance by the analysis module 102 (for example, two, three, four, and so on). In another example, the given number of profiles may depend on the number of all profiles of the cluster and be equal, for example, to the number of all profiles of the cluster, half of the number of profiles of the cluster, and so forth.

In one exemplary aspect, the profiles are profiles of groups of users. Thus, the analysis module 102 in this example may be configured to determine, for each identified cluster, the profiles of groups of users in which not less than a given number of users of this cluster are present. It is considered that a user is in a group if an edge exists between the vertex of the social graph "user profile" and the vertex "user group profile", characterizing the presence of a social link.

The analysis module 102 may determine, from the at least one object previously determined, that there is accordingly at least one object as being forbidden, by finding that object in a database of forbidden objects 106.

The system 100 includes a database 106 of forbidden objects that stores a list of objects of the social network which are forbidden. In some exemplary aspects, the database of forbidden objects 106 may contain the identifiers of forbidden objects. In another exemplary aspect, the database 106 may contain other attributes of objects whose presence indicates that the objects of the social network are forbidden. In one exemplary aspect, the database of forbidden objects 106 may also contain categories of forbidden objects for each such object. In some aspects, initial contents of the database 106 may be obtained from a third-party provider, and added to by the system according to aspects described later. The database of forbidden objects 106 may also be formed in advance by an analyst, for example making use of lists of forbidden objects, the expertise of analysts, and so forth. In some exemplary aspects, the database of forbidden objects 106 may contain objects of one or more different types, for example only group profiles. In one exemplary aspect, the database 106 may contain objects from one or more prohibited categories including malicious content, fraudulent groups, nudity, hate speech, violence and graphic content, other similar objectionable content categories.

Using the analysis module 102, at least one object in the social network is determined to be suspicious if that object is linked to at least one object previously determined to be forbidden.

The system 100 includes a blocking module 103 which is communicatively connected to the analysis module 102. The blocking module 103 is configured to carry out operations for limiting the access of the specified profile to suspicious objects of the social network. In one exemplary aspect, the blocking module 103 may limit access of the specified profile to suspicious objects by forbidding access to the mentioned suspicious objects of the social network. In some exemplary aspects, the blocking module 103 may direct the client module 122 to refrain from displaying, downloading, or accessing content elements from the suspicious objects, or otherwise prevent the client module 122 from doing so. In other exemplary aspects, the blocking module 103 may direct the client module 122 to render a placeholder in lieu of the suspicious objects, and/or redirect the user to an information page or other default content. In some exemplary aspects, the limiting of access by the specified profile to suspicious objects may also involve in particular one of the following actions with the suspicious object, depending on the object: sending a request to the administrator of the social network to remove the content element or close the profile; sending a request to the administrator of the social network to remove some of the content elements contained in the profile when the object is a profile; providing access with a request to verify the user's identity.

Figure 2:
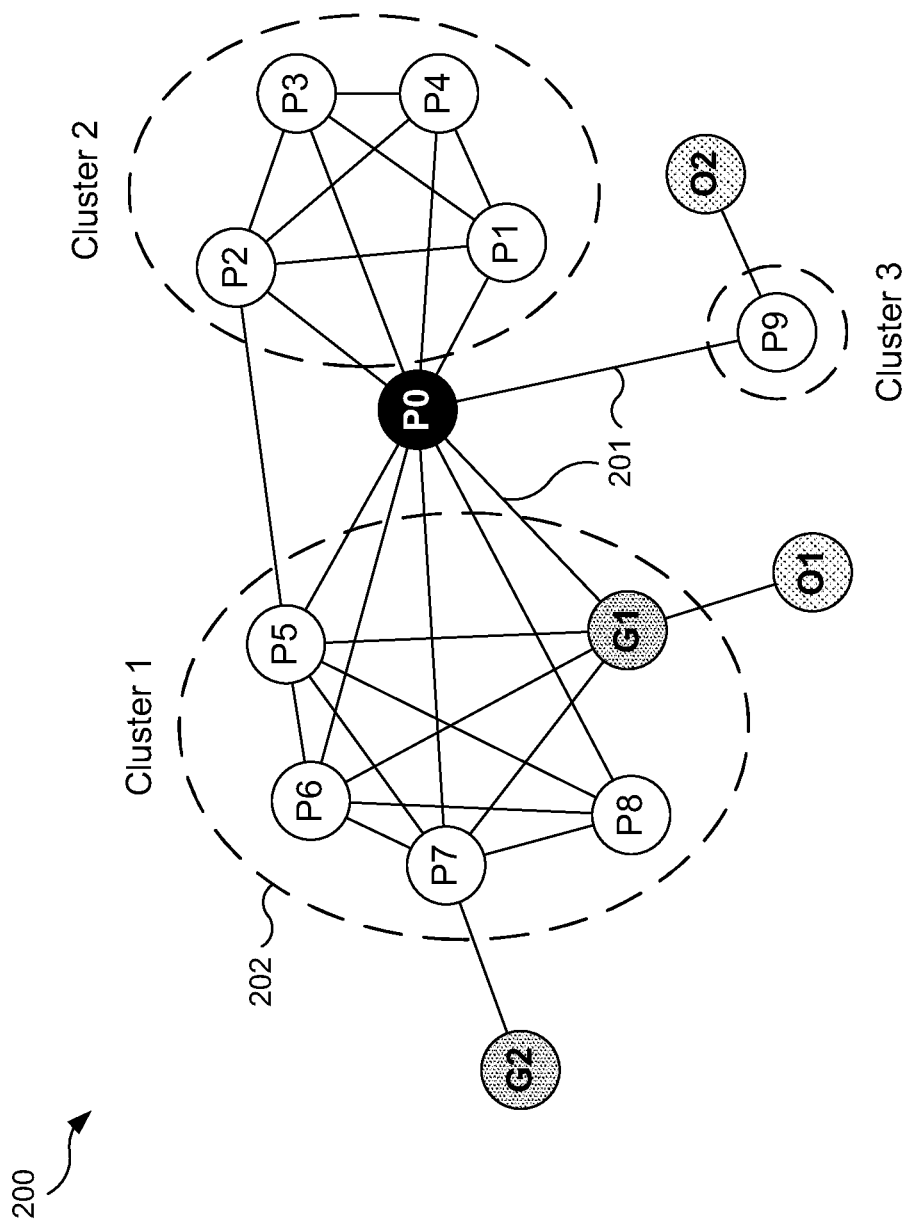
FIG. 2 shows an example of a social graph according to an exemplary aspect.

FIG. 2 shows an example of a social graph 200 according to an exemplary aspect. The social graph 200 is constructed for a selected user profile P0 and contains a plurality of other user profiles, group profiles, and content elements with which the specified user profile P0 is linked by one or more social links 201. In this example, the user profiles are represented by vertices of the graph P0-P9, group profiles by vertices G1, G2, and content elements by vertices O1, O2 (such as photographs, video, audio (music), and so forth). In this example, P0 is the specified user profile, i.e., selected by an administrator. As a result of clustering, the processing module 101 has identified three clusters Cluster 1, Cluster 2, and Cluster 3 (depicted as dashed ovals 202). In one example, the profile P0 is contained in each of the clusters. In other examples, the profile P0 is not associated with any cluster. For ease of presentation, it can be further considered that the profile P0 does not belong to any cluster. The processing module 101 assigns the user profiles P1-P4 to the first cluster; the profiles P5-P8 and the group profile G1 to the second cluster; and only the profile P9 to the third cluster.

Such a method of identifying in a social graph 200 clusters of users illustrates a particular aspect of the present disclosure: each cluster of users contains user profiles between which the number of social links is not less than the number of social links between the user profiles from the different identified clusters. For example, in cluster 1, the vertices P5-P8 and G1 are linked together, and only two vertices—P8 and G1—are not linked. Vertex P5 has one link with vertex P2 of cluster 2, but in cluster 1 vertex P5 has five links. Therefore, the processing module 101 assigns P5 to cluster 1 because otherwise the number of social links (one) from P5 to profiles in cluster 2 would be less than the number of social links of P5 with any other profiles not in cluster 2 (five). Similarly, vertex P2 has five links in cluster 2 and one link with vertex P5 in cluster 1. Vertex P9 is the only one in cluster 3. The group profile G2 and content elements O1, O2 do not belong to any cluster, since they are not linked to the specified profile P0.

Figure 3:
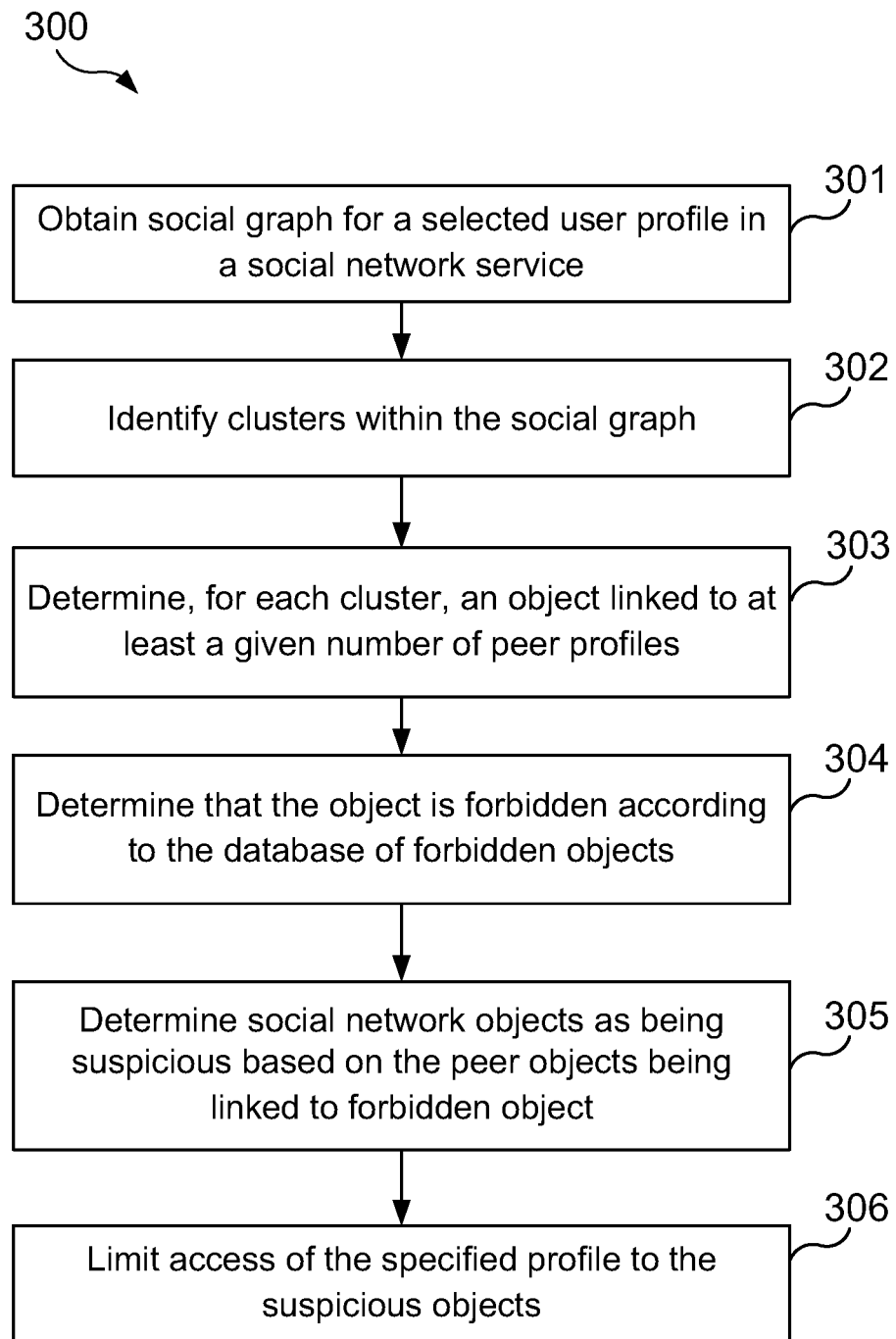
FIG. 3 is a flowchart illustrating a method for limiting user access to suspicious objects of a social network service according to an exemplary aspect.

FIG. 3 is a flowchart illustrating a method 300 for limiting user access to suspicious objects of a social network service according to an exemplary aspect. In step 301 the processing module 101 obtains the social graph 105 constructed for the specified user profile in a social network (hereafter, the profile) and containing the specified profile and at least one other profile of the social network to which the specified profile is linked. Next, in step 302, the processing module 101 identifies in the social graph 105 clusters of profiles according to the given method of clustering. In one exemplary aspect, the processing module 101 may identify the clusters with the use of one or more suitable clustering algorithms, including the Louvain Method for community detection; clique percolation method; and derivation of stochastic block models.

In one exemplary aspect, the method of clustering is determined by the processing module 101. In one example aspect, the choice of the clustering method depends on the number of vertices (objects) or edges (links) in the social graph.

In step 303 the analysis module 102 determines for each identified cluster in the social network at least one object which is linked to no less than (e.g., at least) a given number (such as one, two, three, four, and so forth) of profiles contained in the mentioned identified cluster. In a particular aspect, such profiles are profiles of groups of users. In some exemplary aspects, the analysis module 102 determines, for each identified cluster, at least one object which is linked to at least a threshold amount of peer objects contained in the respective cluster.

Using the analysis module 102 in step 304, from the at least one object so determined (in step 303) there is determined accordingly at least one object as being forbidden by finding that object in the database of forbidden objects 106. In one exemplary aspect, profiles are additionally determined to be suspicious when they belong to one cluster and the majority of the profiles of that cluster are linked to forbidden objects.

Using the analysis module 102, in step 305 at least one object in the social network is determined as being suspicious if that object is linked to at least one object determined to be forbidden (in step 304). In some exemplary aspects, the analysis module 102 determines that the social network objects are characterized as suspicious based on social links between the peer objects and the object identified as forbidden (in step 304).

In one exemplary aspect, for at least one identified cluster all profiles of that cluster are additionally determined to be suspicious if not less than a given number (e.g., an intra-cluster threshold) of the profiles of that cluster have been determined to be suspicious (in step 305). For example, if the cluster has a total of 20 profiles and 7 of them have been determined as being suspicious in step 305, then the remaining 13 profiles will likewise be determined to be suspicious. In another example, if half of the profiles (in the mentioned example, 10) have been determined to be suspicious in step 305, then the remaining profiles of the cluster will also be determined to be suspicious.

As a result, in step 306 the blocking module 103 limits the access of the specified profile to the suspicious objects of the social network.

In some exemplary aspects, in step 306 access to the specified user profile is limited to suspicious objects of the social network which have been found in the database of forbidden objects 106.

Thus, by limiting the access to the specified user profile to suspicious objects of the social network in step 306 the technical problem of accessibility of suspicious objects of social networks is solved and the said technical result is achieved, namely, the assuring of a limiting of access of a user to suspicious objects of a social network.

Let us consider the example of the social graph 200 depicted in FIG. 2. In this example, in step 302, the processing module 101 identifies three clusters. In step 303, the analysis module 102 selects for consideration a group profile G1, since this group is linked to 4 profiles of cluster 1 (P5-P8). Group G2 will not be selected for consideration in step 303, since it is only linked to profile P7. In step 304 the analysis module 102 performs a check to see if group G1 is contained in the database of forbidden objects 106. If so, then in step 305 the analysis module 102 determines that the user profiles P5-P8 are characterized as being suspicious, since they are linked to the forbidden profile of group G1. The content element O1, linked to the forbidden group G1, will also be recognized as suspicious. As a result, in step 306, the blocking module 103 limits access of the specified profile P0 to the content element O1, and in the particular example aspect also to the user profiles P5-P8 and to group G1.

Figure 4:
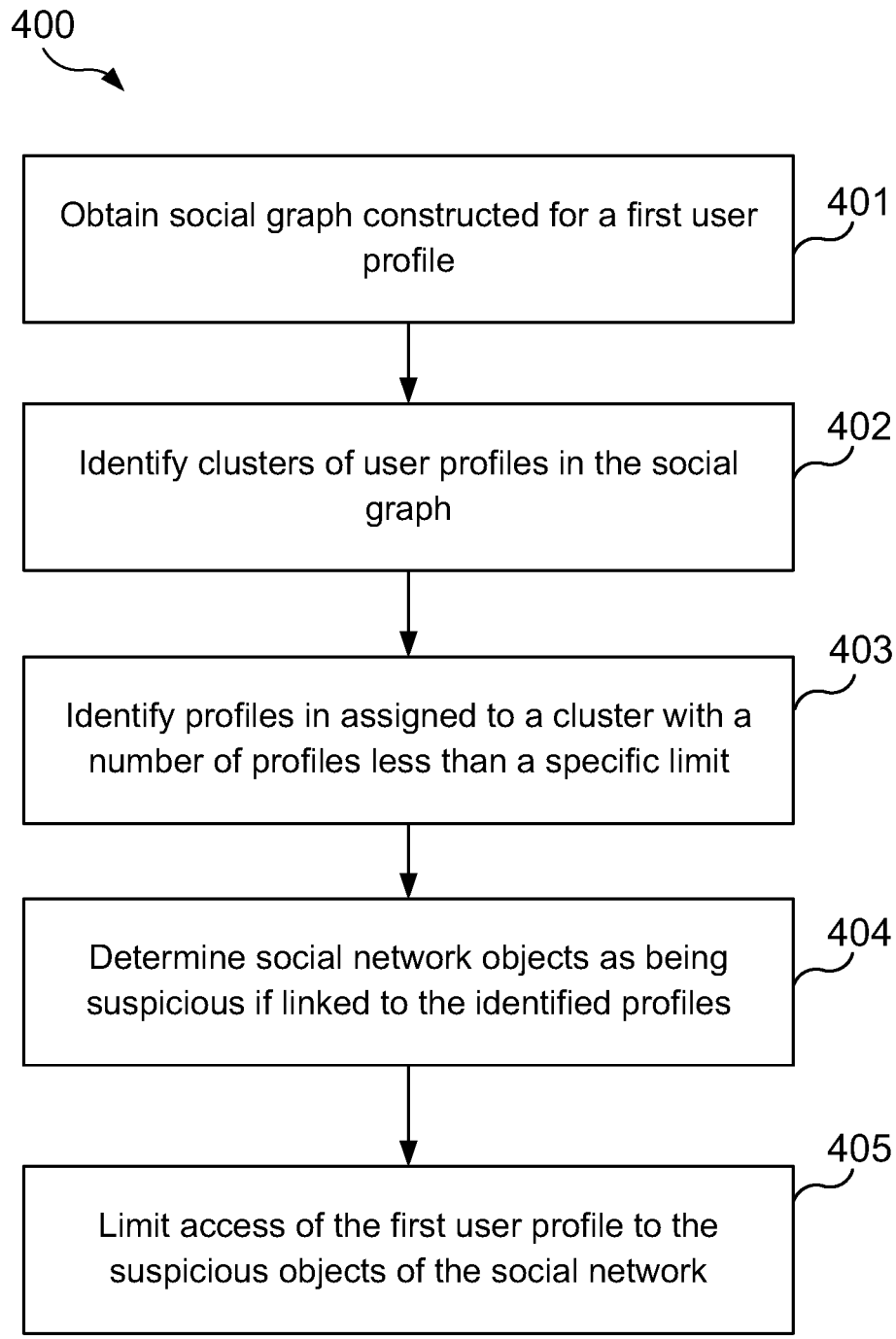
FIG. 4 is a flowchart illustrating another variant of the method for limiting user access to suspicious objects of a social network service according to an exemplary aspect.

FIG. 4 is a flowchart illustrating another variant of the method for limiting user access to suspicious objects of a social network service according to an exemplary aspect. Some of the steps of the method concur with the steps of the method presented in FIG. 3. Thus, in step 401 the processing module 101 obtains the social graph 105 constructed for the specified user profile and containing the specified profile and at least one other profile of the social network to which the specified profile is linked. Then, in step 402, the processing module 101 identifies in the obtained social graph 105 clusters of profiles according to a given clustering algorithm (method).

In step 403, the analysis module 102 is used to identify profiles of the social graph 105 assigned to the cluster with a number of profiles less than a specified limit number (for example, less than two profiles or only one profile). In some exemplary aspects, the analysis module 102 may select objects in the social graph 105 that are assigned to a particular cluster based on a determination that the particular cluster has less than a threshold amount of objects contained therein (i.e., a container threshold). In a particular example, in step 403, profiles are identified which are not assigned to any one of the clusters.

Then, in step 404, the analysis module 102 is used to determine objects of the social network as being suspicious if those objects of the social network have a social link with the identified user profiles of the social graph 105. As a result, in step 405, the blocking module 103 is used to limit the access by the specified user profile to the suspicious objects of the social network. In a particular aspect, access of the specified user profile is limited to suspicious objects of the social network which have been found in the database of forbidden objects 106.

Thus, the method 400 according to FIG. 4 differs from the method 300 according to FIG. 3 in that, in step 303, the analysis module 102 is additionally used to find profiles assigned to a cluster with a number of profiles less than a specified limit number, and in step 305 the analysis module 102 is additionally used to determine objects as being suspicious if those objects have a social link to the identified profiles (identified in step 303).

Consider again the example of the social graph 200 depicted in FIG. 2. In this example, in step 402, the processing module 101 identifies 3 clusters, Cluster 1, Cluster 2, and Cluster 3. In step 403, the analysis module 102 identifies a user profile P9, assigned to cluster 3, with a number of user profiles less than a specified limit number (for example, with a number of profiles less than two). Cluster 3 contains one profile—P9. In step 404, the analysis module 102 determines the content element O2 as being suspicious, since it is linked to user profile P9 of cluster 3. As a result, in step 405, the blocking module 103 limits access of the specified user profile P0 to the suspicious content element O2. In a particular aspect, access of profile P0 to user profile P9 will also be limited.

Figure 5:
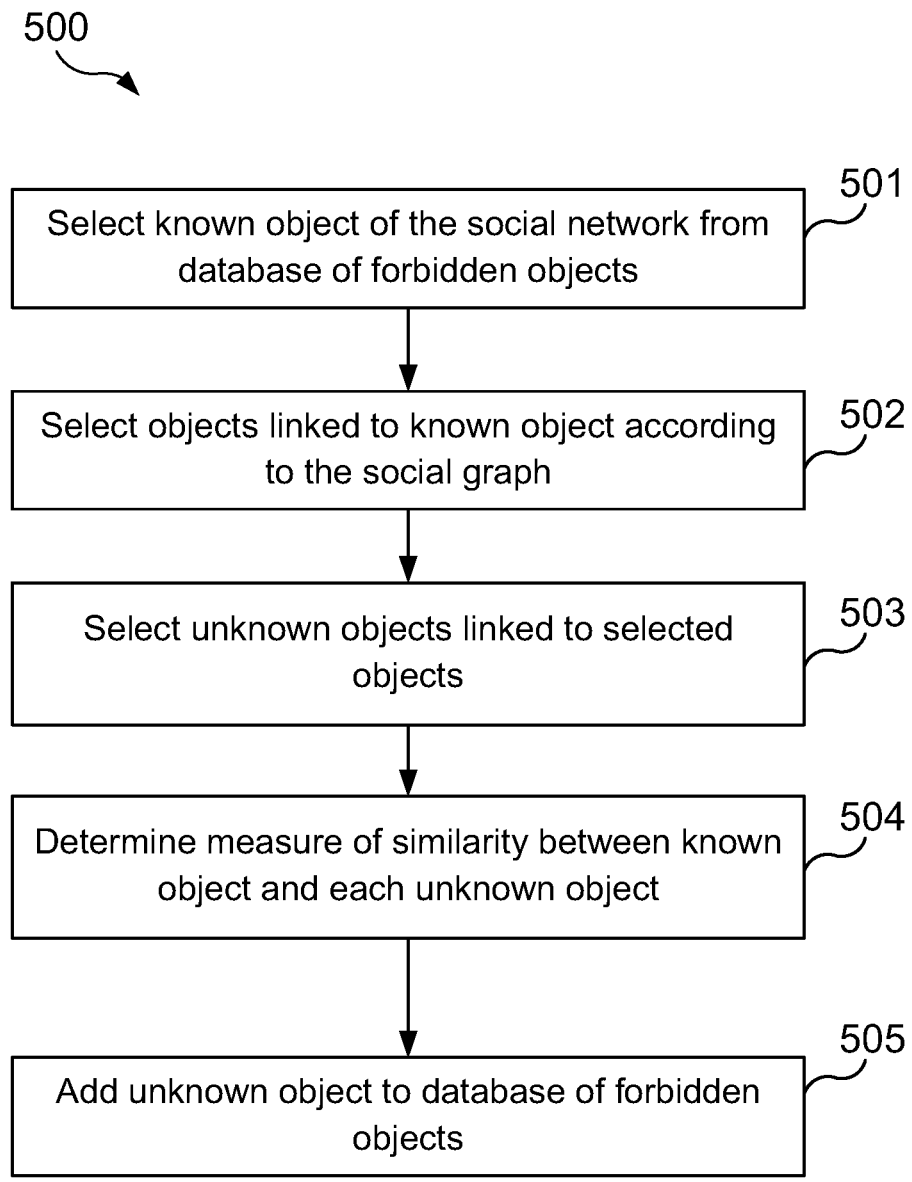
FIG. 5 is a flowchart illustrating a method of filling the database of forbidden objects according to an exemplary aspect.

FIG. 5 is a flowchart of the method 500 of filling the database of forbidden objects according to an exemplary aspect. The method 500 can be carried out, for example, with the use of the blocking module 103. Thus, in the first step 501, the blocking module 103 selects a known object of the social network (such as a user group profile) from the database of forbidden objects 106. Next, in step 502, the blocking module 103 selects objects which are linked to the selected known object using the social graph 150. After this, in step 503, the blocking module 103 selects unknown objects which are absent from the database of forbidden objects 106 and which are linked to the selected objects. In step 504, the blocking module 103 may determine a measure (e.g., metric) of similarity of the known object with each unknown object from the common profiles having a link both to the known object and to the mentioned unknown object. As a result, in step 505, the blocking module 103 adds the unknown object to the database of forbidden objects 106 as being a forbidden object if the measure of similarity of the known object and said unknown object exceeds a given threshold of similarity (for example, more than 50% similar). This threshold limit can be specified in advance by an analyst or, for example, by the blocking module 103. In one exemplary aspect, the measure of similarity of groups is the Jaccard index. In one exemplary aspect, the blocking module 103 assigns the unknown object so added the category of the known object.

Figure 6:
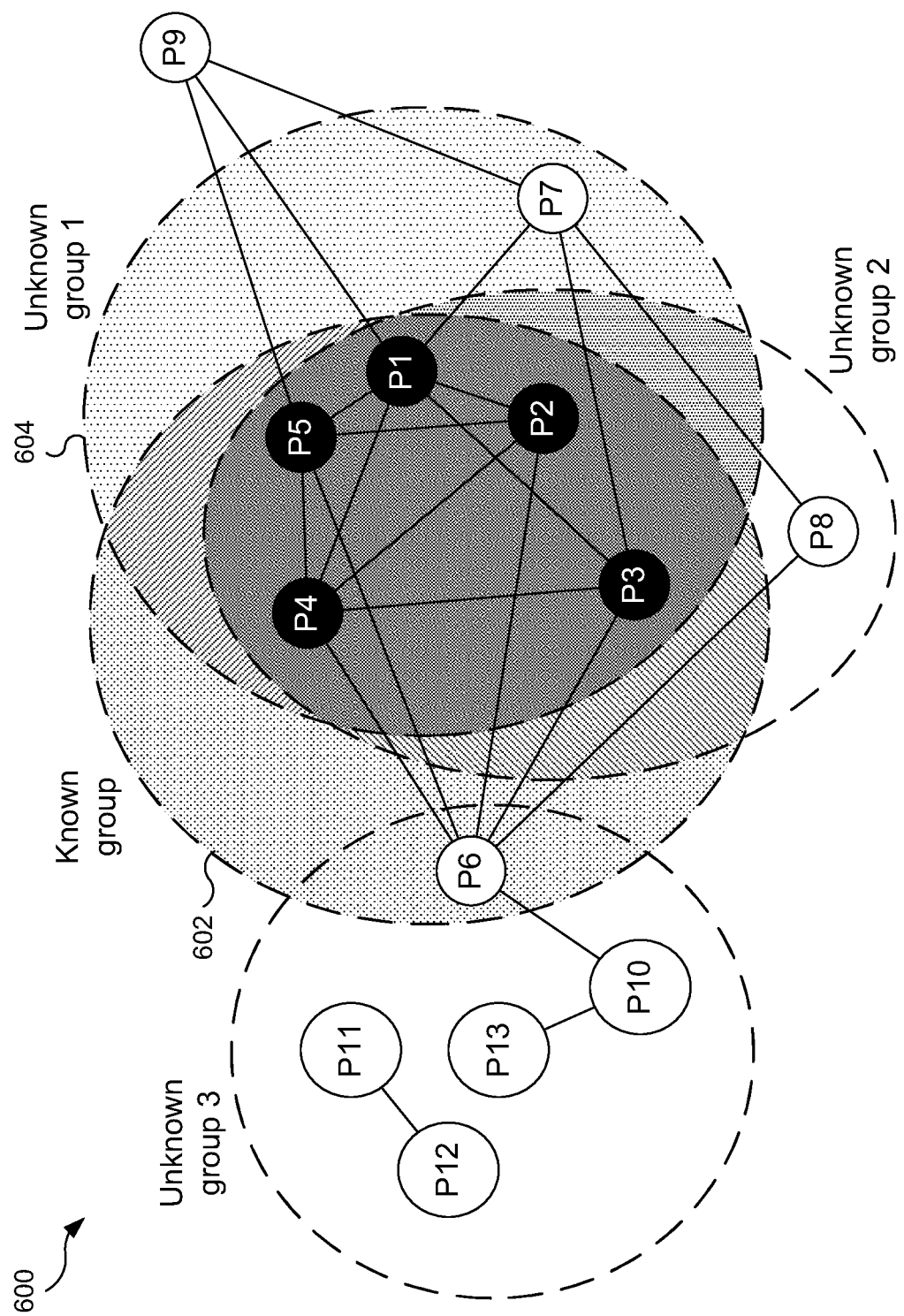
FIG. 6 illustrates an example of implementing the method of filling the database of forbidden objects with the example of a social graph according to an exemplary aspect.

FIG. 6 illustrates an example of the implementing of the method of filling the database of forbidden groups with the example of a social graph 600 using the blocking module 103 according to an exemplary aspect. The figure shows the example of a social graph 600 including user profiles P1-P13. For clarity, the group profiles (e.g., G1, G2, from FIG. 2) are indicated by hatched sets 602 encompassing the graph vertices which are linked to the corresponding group profiles. For example, the profile of a known group (set 602) is linked to profiles P1-P6. The profile of unknown group 1 (set 604) is linked to the user profiles P1-P5 and P7. And the profile of unknown group 2 is linked to profiles P1-P5 and P8. Unknown group 3 includes the users P6 and P10-P13. User P9 does not belong to any of the aforementioned groups.

Thus, returning to the method of FIG. 5, in step 501, the blocking module 103 there selects the profile of a known group of users, then in step 502, the blocking module 103 selects the profiles of users P1-P6. In step 503, the blocking module 103 selects the profiles of the unknown groups 1-3. In step 504, the blocking module 103 calculates a similarity measure for the known group and each unknown group 1-3. As can be seen, the known group and the unknown groups 1 and 2 have 5 users in common, while each of these groups has a total of 6 users. Thus, in step 505, the blocking module 103 adds the profiles of the unknown groups 1 and 2 to the database 106 of forbidden groups, since they have a high measure of similarity to the known group. The unknown group 3 has a low measure of similarity with the known group, having no more than 1 user in common. In one exemplary aspect, the added profiles of the unknown groups 1 and 2 will be assigned the category of the known group (for example, a fraudulent group).

Figure 7:
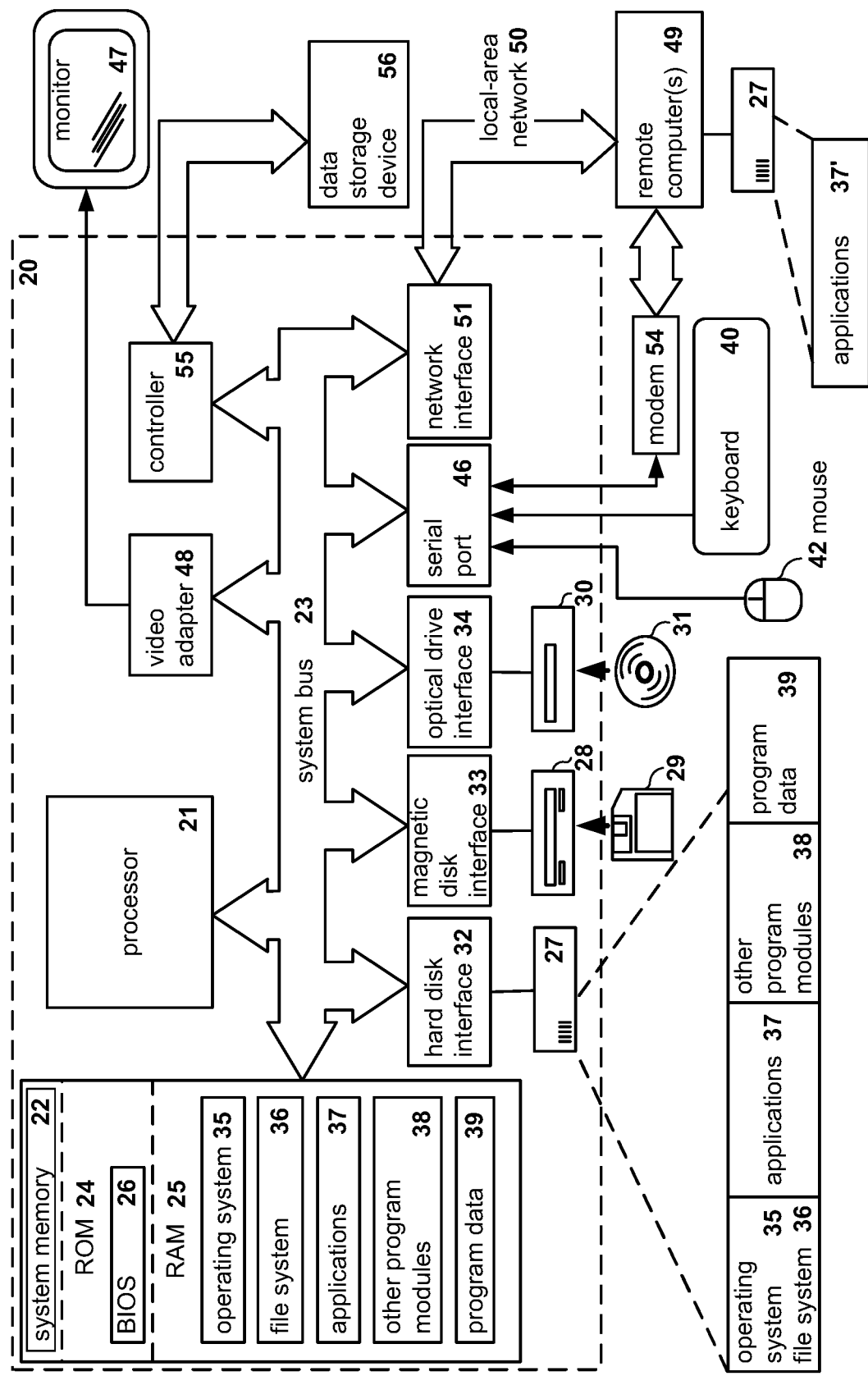
FIG. 7 illustrates a block diagram of a general-purpose computer system on which the disclosed system and method can be implemented according to an exemplary aspect.

FIG. 7 is a diagram illustrating a general-purpose computer system 20 on which aspects of systems and methods for scanning web pages may be implemented in accordance with an exemplary aspect. It should be noted that the computer system 20 can correspond to the system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for limiting user access to suspicious objects of a social network service, wherein the method comprises:
    retrieving a social graph for a first user profile in a social network service, wherein the social graph comprises a plurality of objects to which the first user profile is linked;
    identifying one or more clusters of objects in the social graph;
    determining, for each respective cluster, a first object that is linked to at least a threshold number of peer objects in the respective cluster;
    responsive to determining that the first object is forbidden according to a database of forbidden objects and that the at least threshold number of the peer objects represents a majority of the peer objects of the respective cluster which are linked to the first object, determining that the peer objects of the respective cluster are suspicious; and
    limiting access of the first user profile to the first object and the peer objects determined to be suspicious in the social network service.

2. The method of claim 1, further comprising:
    determining that all objects in a respective cluster are suspicious based on a determination that an intra-cluster threshold has been reached of peer objects in the respective cluster having been determined to be suspicious.

3. The method of claim 1, further comprising:
    selecting a known object in the social network service from the database of forbidden objects;

selecting objects that are linked to the selected known object using the social graph; and adding, to the database of forbidden objects, unknown objects that are absent from the database of forbidden objects and that are linked to the selected known object.

4. The method of claim 3, wherein adding unknown objects to the database of forbidden objects further comprises:

determining a measure of similarity of each unknown object with the known object based on common user profiles having a social link to the known object and to the respective unknown object; and adding the unknown objects responsive to determining that the respective measures of similarity of the unknown objects with the known object exceeds a similarity threshold.

5. The method of claim 1, wherein determining the first object further comprises:

selecting the first object based on a determination that the cluster in which the first object is contained has less than a container threshold number of objects.

6. The method of claim 1, wherein the plurality of objects comprises user profiles, groups of user profiles, and content elements, and wherein the social graph comprises a plurality of social links between the plurality of objects and the first user profile.

7. A system for limiting user access to suspicious objects of a social network service, wherein the system comprises:

a storage device containing a database of forbidden objects; and a processor configured to:

retrieve a social graph for a first user profile in a social network service, wherein the social graph comprises a plurality of objects to which the first user profile is linked;

identify one or more clusters of objects in the social graph;

determine, for each respective cluster, a first object that is linked to at least a threshold number of peer objects in the respective cluster;

responsive to determining that the first object is forbidden according to the database of forbidden objects and that the at least threshold number of the peer objects represents a majority of the peer objects of the respective cluster which are linked to the first object, determine that the peer objects of the respective cluster are suspicious; and limit access of the first user profile to the first object and the peer objects determined to be suspicious in the social network service.

8. The system of claim 7, wherein the processor is further configured to:

determine that all objects in a respective cluster are suspicious based on a determination that an intra-cluster threshold has been reached of peer objects in the respective cluster having been determined to be suspicious.

9. The system of claim 7, wherein the processor is further configured to:

select a known object in the social network service from the database of forbidden objects;

select objects that are linked to the selected known object using the social graph; and add, to the database of forbidden objects, unknown objects that are absent from the database of forbidden objects and that are linked to the selected known object.

10. The system of claim 9, wherein the processor configured to add unknown objects to the database of forbidden objects is further configured to:

determine a measure of similarity of each unknown object with the known object based on common user profiles having a social link to the known object and to the respective unknown object; and add the unknown objects responsive to determining that the respective measures of similarity of the unknown objects with the known object exceeds a similarity threshold.

11. The system of claim 7, wherein the processor configured to determine the first object is further configured to:

select the first object based on a determination that the cluster in which the first object is contained has less than a container threshold number of objects.

12. The system of claim 7, wherein the plurality of objects comprises user profiles, groups of user profiles, and content elements, and wherein the social graph comprises a plurality of social links between the plurality of objects and the first user profile.

13. A non-transitory computer readable medium comprising computer executable instructions for limiting user access to suspicious objects of a social network service, including instructions for:

retrieving a social graph for a first user profile in a social network service, wherein the social graph comprises a plurality of objects to which the first user profile is linked;

identifying one or more clusters of objects in the social graph;

determining, for each respective cluster, a first object that is linked to at least a threshold number of peer objects in the respective cluster;

responsive to determining that the first object is forbidden according to a database of forbidden objects and that the at least threshold number of the peer objects represents a majority of the peer objects of the respective cluster which are linked to the first object, determining that the peer objects of the respective cluster are suspicious; and limiting access of the first user profile to the first object and the peer objects determined to be suspicious in the social network service.

14. The non-transitory computer readable medium of claim 13, further comprising instructions for:

determining that all objects in a respective cluster are suspicious based on a determination that an intra-cluster threshold has been reached of peer objects in the respective cluster having been determined to be suspicious.

15. The non-transitory computer readable medium of claim 13, further comprising instructions for:

selecting a known object in the social network service from the database of forbidden objects;

selecting objects that are linked to the selected known object using the social graph; and adding, to the database of forbidden objects, unknown objects that are absent from the database of forbidden objects and that are linked to the selected known object.

16. The non-transitory computer readable medium of claim 15, wherein instructions for adding unknown objects to the database of forbidden objects further comprise instructions for:

determining a measure of similarity of each unknown object with the known object based on common user profiles having a social link to the known object and to the respective unknown object; and adding the unknown objects responsive to determining that the respective measures of similarity of the unknown objects with the known object exceeds a similarity threshold.

17. The non-transitory computer readable medium of claim 13, wherein instructions for determining the first object further comprise instructions for:

selecting the first object based on a determination that the cluster in which the first object is contained has less than a container threshold number of objects.

* * * * *